(12) United States Patent
Yamada et al.

(10) Patent No.: US 8,665,556 B2
(45) Date of Patent: *Mar. 4, 2014

(54) DISK DRIVE DEVICE PROVIDED WITH FLUID DYNAMIC BEARING

(71) Applicants: Takuji Yamada, Shizuoka (JP); Yuji Omura, Shizuoka (JP); Mitsuo Kodama, Shizuoka (JP)

(72) Inventors: Takuji Yamada, Shizuoka (JP); Yuji Omura, Shizuoka (JP); Mitsuo Kodama, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,191

(22) Filed: Mar. 25, 2013

(65) Prior Publication Data

US 2013/0215531 A1  Aug. 22, 2013

Related U.S. Application Data

(62) Division of application No. 13/530,344, filed on Jun. 22, 2012, now Pat. No. 8,427,778, which is a division of application No. 12/576,179, filed on Oct. 8, 2009, now Pat. No. 8,243,383.

(30) Foreign Application Priority Data

Jan. 30, 2009 (JP) ................................. 2009-020953
Jan. 30, 2009 (JP) ................................. 2009-020954

(51) Int. Cl.
*G11B 17/02* (2006.01)
*F16C 32/06* (2006.01)

(52) U.S. Cl.
USPC ........ 360/98.07; 360/99.08; 310/90; 384/107

(58) Field of Classification Search
USPC ........ 360/98.07, 99.08; 310/90; 384/100, 107
See application file for complete search history.

(56) References Cited

U.S. PATENT DOCUMENTS

| | | | |
|---|---|---|---|
| 5,533,811 A | 7/1996 | Polch et al. | |
| 6,172,847 B1 * | 1/2001 | Sakatani et al. | 360/99.08 |
| 6,920,013 B2 * | 7/2005 | Nishimura et al. | 360/99.08 |
| 6,982,510 B1 * | 1/2006 | Ajello et al. | 310/90 |
| 7,372,663 B2 * | 5/2008 | Leblanc et al. | 360/99.08 |
| 7,626,783 B2 * | 12/2009 | LeBlanc et al. | 360/99.08 |

(Continued)

FOREIGN PATENT DOCUMENTS

JP   63-51190 A  * 12/1994
JP   2000-270514 A  *  9/2000

(Continued)

OTHER PUBLICATIONS

Japanese Patent Office Office Action, Oct. 2012.*

*Primary Examiner* — Jefferson Evans
(74) *Attorney, Agent, or Firm* — Blank Rome LLP

(57) ABSTRACT

A sleeve supports a shaft. A housing member is arranged so as to surround the sleeve and make the end of the sleeve protrude. A base member holds the housing member and fixes a stator core so as to surround the housing member. A hub drives a recording disk by being rotated integrally with the shaft, with a magnet being fixed to an annular portion concentric with the shaft so as to face the stator core fixed to the base member. A thrust member is rotated integrally with the hub, and a descender portion and a ring portion.

19 Claims, 7 Drawing Sheets

(56) References Cited

U.S. PATENT DOCUMENTS

| | | |
|---|---|---|
| 7,982,349 B2 | 7/2011 | Popov et al. |
| 8,087,156 B2 * | 1/2012 | Gomyo et al. ............. 29/603.03 |
| 2005/0099722 A1 * | 5/2005 | Nishimura et al. ........ 360/99.08 |
| 2008/0061646 A1 * | 3/2008 | Kodama et al. ................ 310/90 |
| 2008/0304776 A1 * | 12/2008 | Asada et al. ................. 384/112 |
| 2010/0085662 A1 * | 4/2010 | Gomyo et al. ............. 360/99.08 |

FOREIGN PATENT DOCUMENTS

| | | | |
|---|---|---|---|
| JP | 2004-270820 A | * | 9/2004 |
| JP | 2007-198555 A | * | 8/2007 |
| JP | 2008-092790 A | * | 4/2008 |

* cited by examiner

DISK DRIVE DEVICE PROVIDED WITH FLUID DYNAMIC BEARING

CROSS-REFERENCE TO RELATED APPLICATIONS

This is a Divisional Application based on U.S. Ser. No. 13/530,344, filed on Jun. 22, 2012, now U.S. Pat. No. 8,427,778, which is a Divisional of U.S. Ser. No. 12/576,179, filed on Oct. 8, 2009, which is based upon and claims the benefit of priority from the prior Japanese Patent Application No. 2009-020953, filed on Jan. 30, 2009, and Japanese Patent Application No. 2009-020954, filed on Jan. 30, 2009, the entire contents of which are incorporated herein by reference.

FIELD OF THE INVENTION

The present invention relates to a disk drive device, and in particular, to a disk drive device provided with a fluid dynamic bearing.

DESCRIPTION OF THE RELATED ART

Recently, a disk drive device such as a Hard Disk Drive (HDD) has been dramatically improved in its rotational accuracy by providing a fluid dynamic bearing, allowing the device with high density and large capacity. Due to this, a disk drive device provided with a fluid dynamic bearing has been mounted in a wide variety of apparatuses. Accordingly, the disk drive device has been used in various environments. In particular, the device has been increasingly mounted in portable devices, also called mobile devices, and with this, the disk drive device has been required to have improved impact resistance in order to withstand impacts when dropped, etc. On the other hand, the mobile devices have been, year by year, smaller in size, thinner in thickness, lighter in weight and larger in capacity; and for further realizing these characteristics, it is required that each component composing a disk drive device is further smaller in size and thinner in thickness, and a material for the component is lower in density. As a result, the impact resistant performance thereof is deteriorated, creating a trade-off requirement.

For example, considering the use of the disk drive device in a desk top personal computer, the impact exerted on the disk drive device is approximately 100 G at most, and therefore, when the disk drive device withstands an impact of approximate 300 G as a maximum impact for a short time, for example, 1 ms, there rarely occurs a failure in practical use. However, considering impact situations in the present mobile devices, there may occur a failure in practical use, if the disk drive device does not withstand 800 G as the maximum impact for a short time, for example, 1 ms. To deal with this, an annular convex area sandwiched between a flange portion of a sleeve and one end surface of a sleeve holder, is formed inside a tubular inner trunk portion. A lubricant is filled between the annular convex area and the flange portion as well as between the annular convex area and the sleeve holder (for example, Japanese Patent Application Publication No. 2008-92790, Japanese Patent Application Publication No. 2007-198555 and Japanese Patent Application Publication No. 2004-270820).

With the increasing use of the mobile devices, the impact resistance is required to be further improved. Under such circumstances, the present inventors have made it cleat that the disk drive device is required to withstand even 1300 G or more as the maximum impact for a short time, for example, 1 ms, in order not to cause any failure in practical use. In particular, the disk drive device provided with a fluid dynamic bearing is configured such that fixed bodies and rotating bodies face each other in several narrow gaps, and hence an impact affects all these narrow gaps. Accordingly, there occur many types of failures due to the impact, requiring comprehensive technical innovation to be developed because those cannot be solved by a single technical innovation. Further, the inventors have intensively studied on the influence by a strong impact occurring when dropped, etc., on the disk drive device, at the level of components, thereby acquiring the following classification for the types of failures.

A first type of failures occurs due to deformation of a component itself. When an impact acceleration is applied to the disk drive device, a stress occurs in accordance with the mass of the component. When the stress exceeds the elastic limit of the component, deformation occurs. In the disk drive device into which the fluid dynamic bearing or the like is accurately incorporated so as to be slightly spaced apart, the deformation of the component causes a malfunction in the entire disk drive device. A second type thereof occurs due to the deformation of a joint portion between a plurality of components. The joint portion is likely to cause stress concentration and has a low strength in comparison with that of the integral portion, and therefore deformation or destruction by a stress due to an impact acceleration occurs, causing the disk drive device to be in a malfunction.

A third type thereof occurs due to scattering of the lubricant filled between the rotating body and the fixed body, by the impact occurring when dropped, etc. In the disk drive device provided with the fluid dynamic bearing, the rotating body is supported by a dynamic pressure generated in the lubricant, making sufficient presence of the lubricant indispensable. However, scattering of the lubricant by the impact acceleration causes shortage of the lubricant, thereby the disk drive device being in a malfunction such as burn-in of a bearing, in a short time. A fourth type thereof occurs due to temporary elastic deformation of a component. For example, part of components of the fixed bodies deforms in the elastic region by a stress due to an impact acceleration, and thereby the part thereof is scraped due to a contact with part of components of the rotating bodies, even for a short time, causing scraped powder, etc. The scraped powder enters the gap of the fluid dynamic bearing and promotes the wearing thereof, causing the fluid dynamic bearing to be in a malfunction such as burn-in of a bearing in a short time. In order to improve the impact resistance of the disk drive device such that the device withstands 1300 G or more as the maximum impact for a short time, for example, 1 ms, the disk has to comprehensively deal with all of the aforementioned four types of failures; however, dealing with the third type thereof is particularly effective.

SUMMARY OF THE INVENTION

The present invention has been made in view of these circumstances, and a purpose of the invention is to provide a technique in which the impact resistance against an impact when dropped, etc., is improved.

In order to solve the aforementioned problems, a disk drive device according to an embodiment of the present invention comprises: a tubular sleeve that supports a shaft; a tubular housing member that is arranged so as to surround the sleeve and make the end of the sleeve protrude; a base member that holds the housing member and fixes a stator core so as to surround the housing member; a hub that drives a recording disk by being rotated integrally with the shaft, with a magnet being fixed to an annular portion concentric with the shaft so as to face the stator core fixed to the base member; and a tubular thrust member that is rotated integrally with the hub. The sleeve has a flange extending in the outer diameter direction at the hub side edge, and forms a first annular area between the flange and the hub side edge of the housing member; the base member forms a second annular area on the outer circumference side of the housing member; the thrust member has a ring portion that surrounds the sleeve and a descender portion that surrounds the housing member, where the ring portion is fixed, with an adhesive, to the interior wall of a hub side tubular wall formed in the hub, and is rotated in the first area, and where the descender portion is joined to the outer edge portion of the ring portion and fixed, with an adhesive, to the interior wall of the hub side tubular wall, and is rotated in the second area; and a lubricant is filled between the housing member and the thrust member, and also between the flange of the sleeve and the hub.

According to the embodiment, because the thrust member has the descender portion in addition to the ring portion, the fixing area with the hub can be enlarged and the capacity of a capillary seal can be enlarged, allowing the impact resistance to be improved.

The base side edge of the descender portion of the thrust member may be formed so as to more protrude than that of the hub side tubular wall. In this case, because the adhesive is suppressed from entering the capillary seal, allowing an amount of the adhesive to be applied, to be increased.

A concave-shaped area may be formed in the boundary portion between the exterior wall of the descender portion of the thrust member and the interior wall at the base side edge of the hub side tubular wall such that a redundant component of the adhesive used for fixing the exterior wall thereof and the interior wall thereof together is retained. In this case, an situation in which the adhesive has been applied can be readily confirmed, allowing variation in adhesive strength to be suppressed.

A protrusion extending in the outer diameter direction may be formed at the base side edge of the descender portion of the thrust member. In this case, because the adhesive can be suppressed from entering the capillary seal, allowing an amount of the adhesive to be applied, to be increased.

The hub may fix the shaft such that one end of the shaft is directed toward the sleeve, and the sleeve may store the shaft inside a tubular end surface. In this case, the tip of the shaft is protected if an impact is applied thereto, allowing an amount of scraped powder to be generated, to be reduced.

The hub has a hole into which the shaft is press-fitted, and a step portion may be formed on the shaft such that, among the shaft, the portion press-fitted into the hole has a smaller diameter than that of another portion. In this case, tilt of the shaft can be suppressed and the adhesive can also be suppressed from entering the bearing portion, allowing an amount of the adhesive to be applied, to be increased.

When the diameter of the shaft is 2.5 mm or less, the force for extracting the shaft press-fitted into the hole of the hub, may be 600 N or more. In this case, the disk drive device withstands the maximum impact of 1300 G for a short time, allowing a possibility that a failure may occur in practical use to be reduced.

The hub may have an inner circumferential wall of the annular portion and a protruded pedestal portion formed at a position spaced apart from the inner circumferential wall in the central direction of the hub, and fix the magnet with the pedestal portion and the inner circumferential wall. In this case, the annular portion can be suppressed from being thin because the pedestal portion is provided, allowing decrease in the strength against the impact to be suppressed.

In the case where a recording disk is mounted on the hub, and when the center of gravity of the rotating body including the hub, the shaft and the thrust member is located near a position where the hub and the shaft are fixed together, a distance between the center position of the stator core in the direction from the base member toward the hub, and the center of gravity of the rotating body in the same direction, may be 1.8 mm or less. In this case, the center position and the center of gravity are located closely to each other, allowing the impact resistance to be improved.

Another embodiment of the present invention is also a disk drive device. The device comprises: a tubular sleeve that supports a shaft; a tubular housing member that is arranged so as to surround the sleeve and make the end of the sleeve protrude; a base member that holds the housing member and fixes a stator core so as to surround the housing member; a hub that drives a recording disk by being rotated integrally with the shaft, with a magnet being fixed to an annular portion concentric with the shaft so as to face the stator core fixed to the base member; and a tubular thrust member that is rotated integrally with the hub. The sleeve has a flange extending in the outer diameter direction at the hub side edge, and forms a first annular area between the flange and the hub side edge of the housing member; the base member forms a second annular area on the outer circumference side of the housing member; the thrust member has a ring portion that surrounds the sleeve and a descender portion that surrounds the housing member, where the ring portion is fixed to the interior wall of a hub side tubular wall formed in the hub, and is rotated in the first area, and where the descender portion is joined to the outer edge portion of the ring portion and fixed to the interior wall of the hub side tubular wall, and is rotated in the second area; and a lubricant is filled between the housing member and the thrust member, and also between the flange of the sleeve and the hub.

According to the embodiment, because the thrust member has the descender portion in addition to the ring portion, the fixing area with the hub can be enlarged and the capacity of a capillary seal can be enlarged, allowing the impact resistance to be improved.

The thrust member may be formed by press working of a metallic material. In this case, generation of burr is reduced, allowing a possibility of the bun coming off due to an impact to be reduced.

In the ring portion of the thrust member, on at least one of the wall facing the flange of the sleeve and the wall facing the hub side edge of the housing member, a thrust dynamic pressure groove for generating a thrust dynamic pressure may be formed by press working. In this case, generation of the bun is reduced, allowing a possibility of the bun coming off due to an impact to be reduced.

The thrust member may be formed of a plastic material. In this case, the thrust member is formed by a metallic mold, allowing a possibility that the bun may be generated, to be reduced.

The interior wall of the descender portion of the thrust member may be formed such that the surface roughness thereof is Ry 1.6 or less. In this case, the gas-liquid boundary of the lubricant has a fillet geometry, allowing an amount of the lubricant to fall or be scattered to be reduced even if an impact is applied.

A concave-shaped area may be formed in a place where the interior wall of the descender portion of the thrust member and the ring portion are joined together. In this case, because the concave-shaped area is formed, the capacity of a capillary seal portion can be enlarged, allowing the capacity of the lubricant to be enlarged.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
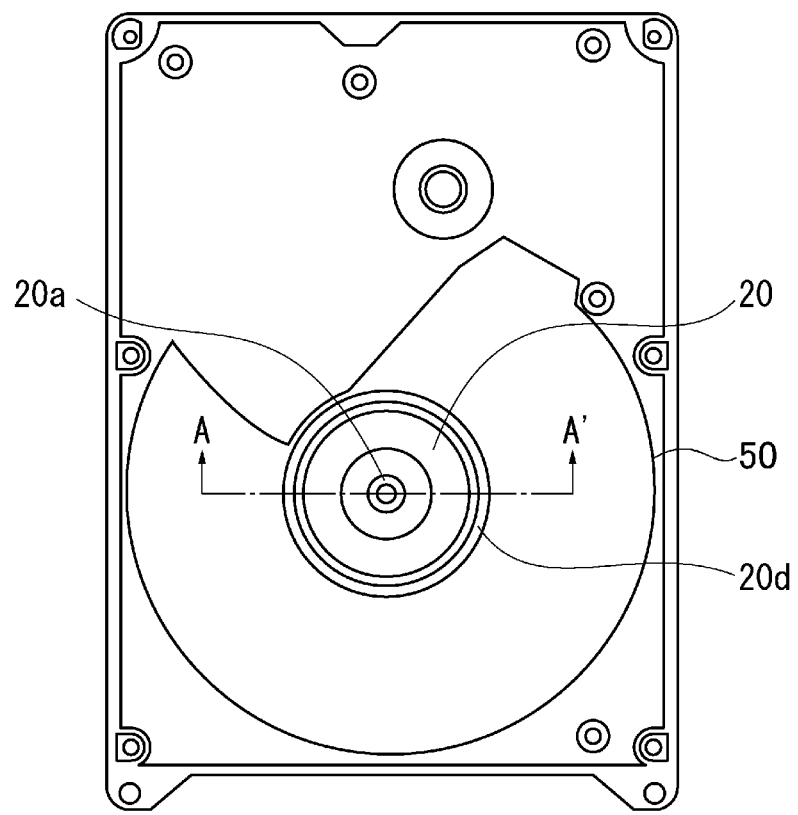
FIG. 1 is a top view illustrating a structure of a disk drive device according to an embodiment of the present invention.

The invention will now be described by reference to the preferred embodiments. This does not intend to limit the scope of the present invention, but to exemplify the invention. An embodiment of the present invention is a disk drive device that is mounted in a hard disk drive and used for driving a magnetic recording disk, and a rotation speed thereof is, for example, 5400 rpm. Hereinafter, the same or equivalent constituting elements and members illustrated in each drawing shall be denoted by the same reference numerals, and the duplicative explanations will be omitted appropriately. Dimensions of members illustrated in each drawing are appropriately enlarged or reduced for easier understanding. Part of members not important for describing the embodiment are omitted from each drawing.

FIG. 1 is a top view illustrating the structure of a disk drive device 100 according to an embodiment of the present invention. The disk drive device 100 includes a hub 20, which is formed into a circular shape. A central hole 20a is formed in the central portion of the hub 20, and a hub outward extension portion 20d is formed in the outer circumferential portion thereof. Herein, the hub 20 is rotated around the central hole 20a. A disk 50 is formed into a donut shape. The inner circumferential portion of the disk 50 is fixed to the hub 20. As a result, with the rotation of the hub 20, the disk 50 is also rotated.

Figure 2:
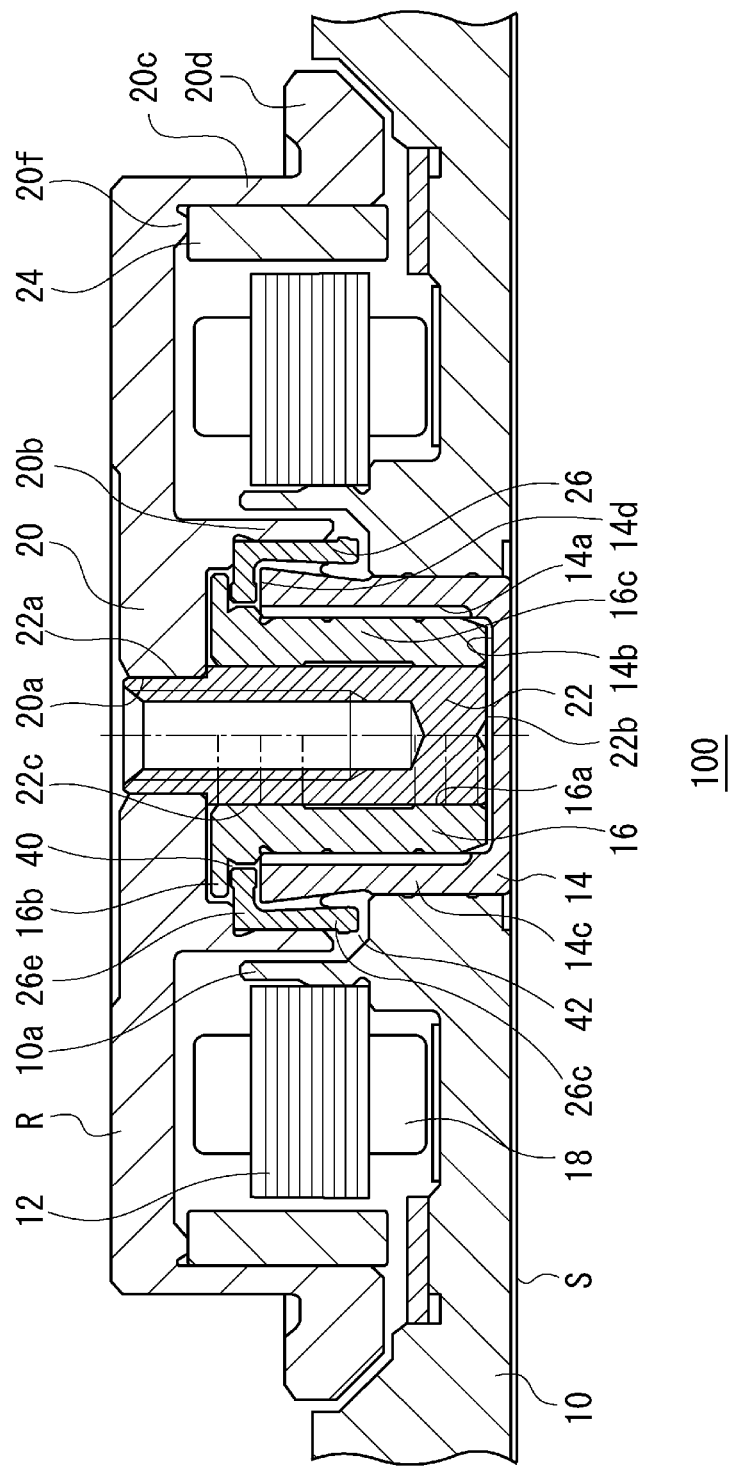
FIG. 2 is a cross-sectional view illustrating the structure of the disk drive device in FIG. 1, taken along line A-A' of FIG. 1.

FIG. 2 is a cross-sectional view illustrating the structure of the disk drive device 100, taken along line A-A' of FIG. 1. The disk drive device 100 includes a fixed body S and a rotating body R. The fixed body S includes a base member 10, a stator core 12, a housing member 14 and a sleeve 16; while the rotating body R includes the hub 20, a shaft 22 and a thrust member 26. The base member 10 includes a cylindrical portion 10a; the housing member 14 includes a groove 14a, a bottom portion 14b, a cylindrical portion 14c and an upper end surface portion 14d; the sleeve 16 includes an inner circumferential surface 16a of the cylindrical portion, a flange portion 16b and cylindrical portion 16c; and coil 18 is wound around the stator core 12. The hub 20 includes the central hole 20a, a first cylindrical portion 20b, a second cylindrical portion 20c, the hub outward extension portion 20d and a pedestal portion 20f; the shaft 22 includes a step portion 22a, a tip portion 22b and an outer circumferential surface 22c; and the thrust member 26 includes a descender portion 26c and a ring portion 26e. In the following descriptions, for convenience, the lower portion indicated in the drawings is represented as the bottom, and the upper portion as the top, as a whole.

The base member 10 has a central hole and the cylindrical portion 10a that is provided so as to surround the central hole. The base member 10 holds the housing member 14 with the central hole and fixes the stator core 12 to the outer circumferential side of the cylindrical portion 10a that surrounds the housing member 14. A second annular area 42 is formed between the outer circumferential side of the housing member 14 and the inner circumferential side of the cylindrical portion 10a. The second annular area 42 has a shape that surrounds the central hole of the base member 10. Herein, the base member 10 is formed by cutting of an aluminum die cast material, or by press working of an aluminum sheet or a nickel-plated steel sheet.

The stator core 12 is fixed to the outer circumferential surface of the cylindrical portion 10a. The stator core 12 is formed by performing insulation coating such as electro-deposition coating and powder coating on the surface thereof after a plurality of magnetic plates such as ferrosilicon plates are laminated. The stator core 12 is ring-shaped so as to have a plurality of salient poles (not illustrated) protruding outwards, around each of which is wound the coil 18. When the disk drive device 100 is, for example, three-phase driven, the number of the salient poles are designed to be nine. The wiring terminal of the coil 18 is soldered on an FPC (Flexible Printed Circuits) arranged on the bottom surface of the base member 10.

The housing member 14 is fixed to the inner circumferential surface of the cylindrical portion 10a by adhesion or press-fitting. The housing member 14 has an approximate cup shape in which the cylindrical portion 14c surrounding the sleeve 16, the upper end surface portion 14d that is provided at the side end portion of the hub 20 and has a surface in the axial direction, and the bottom portion 14b that seals the end portion on the opposite side of the upper end surface portion 14d among the cylindrical portion 14c, are joined together. With such a shape, the housing member 14 is arranged so as to clog the lower end of the sleeve 16 and make the upper end thereof protrude. Herein, the bottom portion 14b and the cylindrical portion 14c may be integrally formed, or be formed by fixing them together as separate members. The housing member 14 is formed of a plastic material such as polyetherimide, polyimide and polyamide as well as a copper alloy, a sintered alloy by powder metallurgy, and stainless. When a plastic material is used in the housing member 14, the member 14 is configured with a plastic material including a carbon fiber such that the specific resistance of the member 14 is $10^6$ (Ω•m) or less in order to secure the static electricity removal performance thereof.

Figure 3:
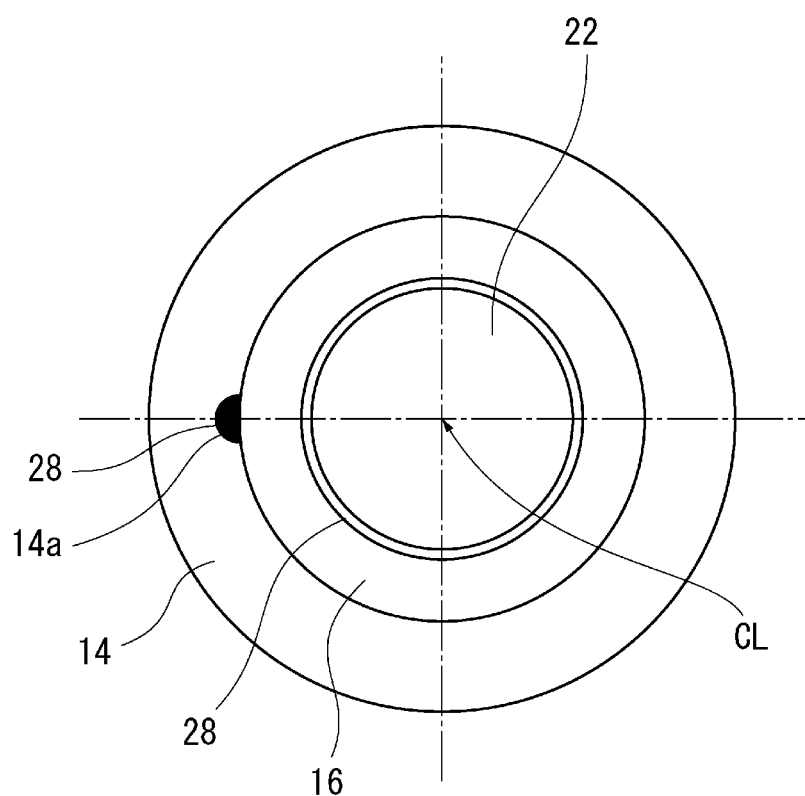
FIG. 3 is a top view illustrating a communication passage of the disk drive device in FIG. 2.

Herein, the inner circumferential surface of the housing member 14 will be described, referring to FIG. 3. FIG. 3 is a top view illustrating a communication passage of the disk drive device 100. As illustrated, a groove 14a extending in the axial direction is formed on the inner circumferential surface of the housing member 14. The groove 14a becomes a communication hole through which both end surface sides of the housing member 14 communicate with each other, when fitting the sleeve 16 into the cylindrical portion 14c. The communication hole becomes the communication passage I with the lubricant 28 being filled therein, which will be described in detail later. The cross-sectional shape of the groove 14a is illustrated as being arc-shaped in FIG. 3, but not limited thereto and may be any concave area recessed from the inner circumferential surface. Now, refer back to FIG. 2.

The sleeve 16 is fixed to the inner circumferential surface of the housing member 14 by adhesion or press-fitting, and is fixed coaxially with the central hole of the base member 10. The sleeve 16 has, by storing the shaft 22, a shape in which the annular cylindrical portion 16c that supports the shaft 22, and the flange portion 16b extending in the outer diameter direction at the side end portion of the hub 20 of the cylindrical portion 16c, are joined together. The inner circumferential surface 16a of the cylindrical portion is formed inside the cylindrical portion 16c, and the inner circumferential surface 16a of the cylindrical portion surrounds the shaft 22. Herein, the flange portion 16b and the cylindrical portion 16c may be integrally formed, or be formed by fixing them together as separate members. A first annular area 40 is formed between the flange portion 16b and the cylindrical portion 14c. The sleeve 16 is formed of a plastic material such as polyetherimide, polyimide and polyamide as well as a copper alloy, a sintered alloy by powder metallurgy, and stainless. When a plastic material is used in the sleeve 16, the sleeve 16 is configured with a plastic material including a carbon fiber such that the specific resistance of the sleeve 16 is $10^6$ (Ω●m) or less in order to secure the static electricity removal performance thereof.

The hub 20 is configured to include the central hole 20a provided in the central portion thereof, the first cylindrical portion 20b provided so as to surround the central hole 20a, the second cylindrical portion 20c arranged outside the first cylindrical portion 20b, and the hub outward extension portion 20d extending outwards at the lower end of the second cylindrical portion 20c. The hub 20 has an approximate cup shape. The thrust member 26 is fixed to the inner circumferential surface of the first cylindrical portion 20b, and a ring-shaped magnet 24 is fixed to the inner circumferential surface of the second cylindrical portion 20c. Herein, the ring-shaped magnet 24 is fixed to the annular portion concentric with the shaft 22 so as to face the stator core 12 fixed to the base member 10. With such a structure, the hub 20 is rotated integrally with the shaft 22 to drive the not-illustrated disk 50. The hub 20 is formed of a stainless material having magnetism, and the not-illustrated disk 50 is mounted on the hub outward extension portion 20d such that the central hole thereof is fitted into the outer circumferential surface of the second cylindrical portion 20c.

The shaft 22 is fixed to the central hole 20a. Herein, the upper end portion of the shaft 22 is provided with the step portion 22a, and the shaft 22 is press-fitted into the central hole 20a when assembling. As a result, the hub 20 is restricted in the movement in the axial direction by the step portion 22a, and is integrated with the shaft 22 at a predetermined right angle. The tip portion 22b is stored in the inner circumference of the cylindrical portion 16c. The shaft 22 is formed of a stainless material.

The thrust member 26 has the ring portion 26e surrounding the sleeve 16 and the descender portion 26c surrounding the housing member 14. Herein, the ring portion 26e is fixed to the interior wall of the first cylindrical portion 20b with an adhesive, and the descender portion 26c is joined to the outer edge portion of the ring portion 26e and also fixed to the interior wall of the first cylindrical portion 20b with an adhesive. That is, the outer circumferential surface of the descender portion 26c is fixed to the inner circumferential surface of the first cylindrical portion 20b with an adhesive. With such a structure, the ring portion 26e surrounds the outer circumference of the cylindrical portion 16c through a gap and is arranged on the lower surface of the flange portion 16b thought a narrow gap. Further, the thrust member 26 is rotated integrally with the hub, and at the time, the ring portion 26e is rotated in the first area 40 and the descender portion 26c is rotated in the second area 42.

Figure 4:
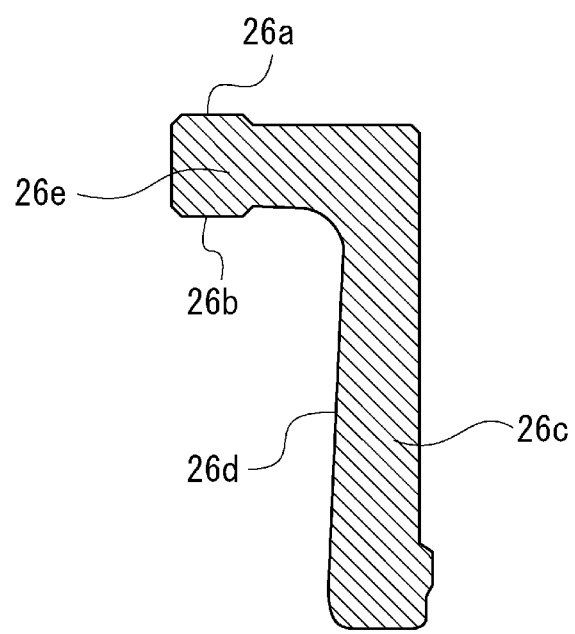
FIG. 4 is an enlarged cross-sectional view illustrating a thrust member in FIG. 2.

FIG. 4 is an enlarged cross-sectional view illustrating the thrust member 26. The ring portion 26e has a shape having a thrust upper surface 26a and a thrust lower surface 26b, the shape being thin in the axial direction. The descender portion 26c extends in the axial direction on the lower surface of the outer circumference side of the ring portion 26e. Further, the thrust member 26 joins the ring portion 26e and the descender portion 26c together, and has a so-called inverted L-shaped cross section in which the alphabetical capital letter "L" is inverted upside down. Herein, the length in the axial direction of the descender portion 26c is larger than that in the axial direction of the ring portion 26e. The inner circumferential surface 26d of the descender portion 26c has a tapered shape, the radius of which is gradually smaller toward the side opposite to the ring portion 26e, and composes a capillary seal, which will be described later. With such a shape, the thrust member 26 can be readily processed and becomes inexpensive. Further, when the thrust member 26 becomes small in size and thin, the thrust member 26 can be manufactured so as to have good dimension accuracy. As a result, such a shape contributes to the miniaturization and light weight of the disk drive device 100. Now, refers back to FIG. 2.

The thrust member 26 prevents the rotating body R from coming off the fixed body S. When the rotating body R and the fixed body S relatively move by an impact, the ring portion 26e hit the lower surface of the flange portion 16b. As a result, the thrust member 26 receives a stress in the direction in which the member 26 is detached from the first cylindrical portion 20b. If the joint distance between the descender portion 26c and the first cylindrical portion 20b is small, the joint strength becomes weak, causing a possibility that the joint therebetween may be destroyed by even a small impact to be high. That is, as the joint distance between the descender portion 26c and the first cylindrical portion 20b becomes longer, the joint therebetween becomes stronger against an impact.

On the other hand, as the ring portion 26e becomes thicker, the capillary seal portion becomes shorter, causing the capacity of the lubricant 28 that can be held in the capillary seal portion to be small. Therefore, there occurs a possibility that the lubricant 28 may be in shortage immediately after the lubricant 28 is scattered by an impact. Due to such shortage of the lubricant, the dynamic pressure groove bearing is deteriorated in its function, likely causing a malfunction such as born-in. In order to deal with such a problem, the capillary seal portion in the disk drive device 100 is designed to be long in the up-down direction by thinning the ring portion 26e. As a result, an amount of the lubricant 28 that can be held becomes large, and the disk drive device 100 is configured such that the lubricant 28 is hardly in shortage if a large amount thereof is scattered. That is, the distance in the axial direction of the thrust member 26 is designed to be large relative to the descender portion 26c and small relative to the ring portion 26e.

There is a way in which the outer circumferential surface of the descender portion 26c is fixed to the inner circumferential surface of the first cylindrical portion 20b by press-fitting; however, if the descender portion 26c receives a stress by the press-fitting, deformation occurs in the inner circumferential surface of the descender portion 26c, and therefore there is a fear that the function of the capillary seal portion may be impaired due to the deformation. To deal with the problem, the outer circumferential surface of the descender portion 26c is designed to have a smaller diameter than that of the inner circumferential surface of the first cylindrical portion 20b such that both of them are fixed together by adhesion. As a result, deformation of the descender portion 26c is prevented, allowing the function of the capillary seal to be fully demonstrated.

The ring-shaped magnet 24 is provided so as to be fixed to the inner circumference of the second cylindrical portion 20c and to face the outer circumference of the stator core 12 through a narrow gap. The ring-shaped magnet 24 is formed of an Nd—Fe—B (Neodymium-Ferrum-Boron) material, the surface thereof being treated with electro-deposition coating and splay coating, and the inner circumference thereof being magnetized in twelve poles.

Summarizing the descriptions up to now, the shaft 22 of the rotating body R is inserted in the inner circumferential surface 16a of the cylindrical portion in the fixed body S; and the rotating body R is rotatably supported by the fixed body S through the dynamic pressure groove, which is described later. The tip portion 22b is set in size so as to face the bottom portion 14b through a predetermined gap in this state. Further, the hub 20 structures a magnetic circuit with the stator core 12 and the ring-shaped magnet 24, and each coil 18 thereof is sequentially powered by the control from outside such that the rotating body R is rotatbly driven.

Figure 5:
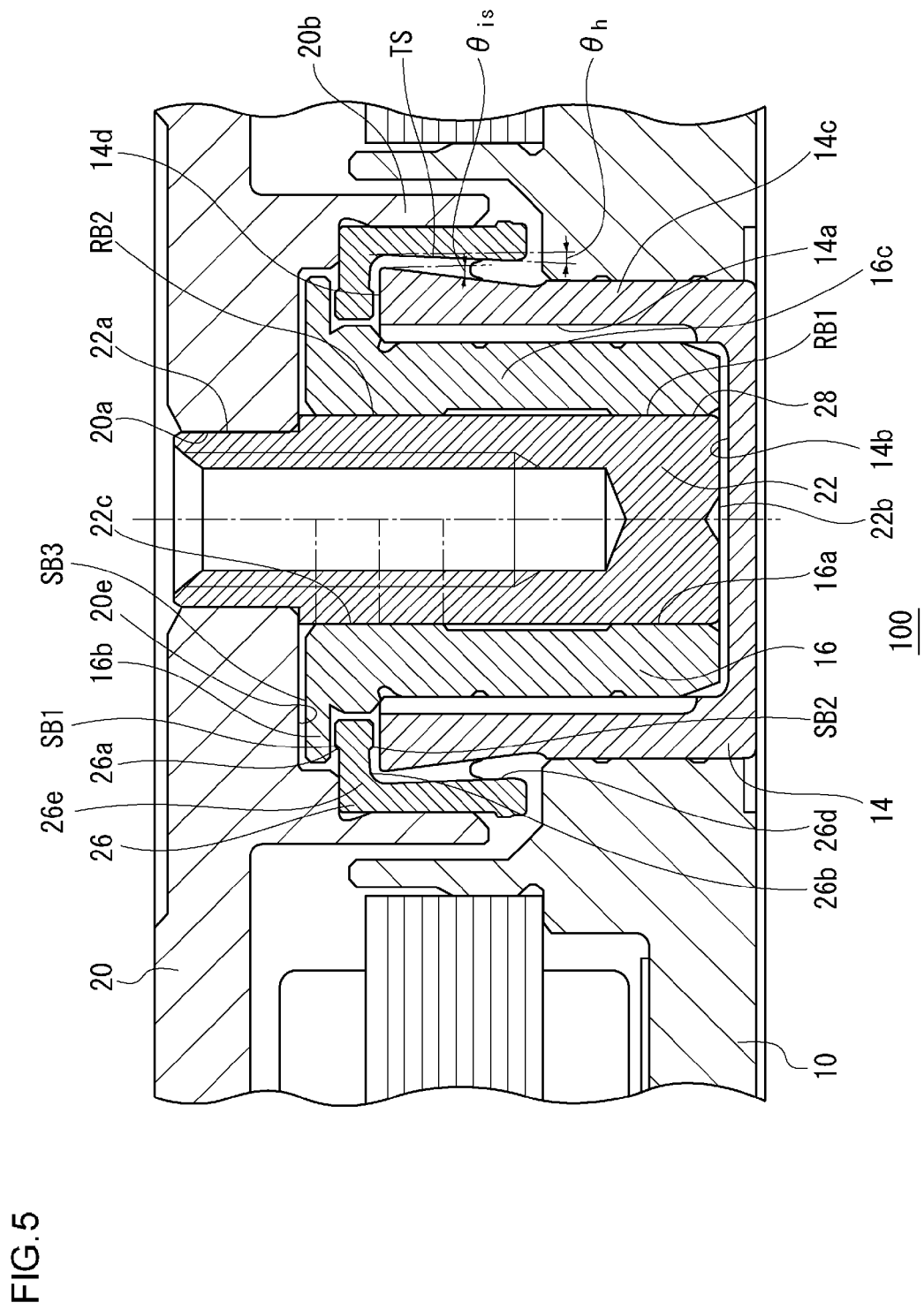
FIG. 5 is an enlarged cross-sectional view illustrating the middle portion of the disk drive device in FIG. 2.

Subsequently, the dynamic pressure bearing in the structure of the disk drive device 100 described up to now, will be described in detail. FIG. 5 is an enlarged cross-sectional view illustrating the middle portion of the disk drive device 100. The dynamic pressure bearing in the radial direction is configured to include the outer circumferential surface 22c, the inner circumferential surface 16a of the cylindrical portion and the lubricant 28 such as oil, etc., filled in the gap between the two. In the dynamic pressure bearing in the radial direction, a first radial dynamic pressure bearing RB1 and a second radial dynamic pressure bearing RB2 are arranged so as to be spaced apart from each other in the axial direction, in which the former is arranged at a position more distant from the hub 20 and the latter at a position nearer thereto. The first radial dynamic pressure bearing RB1 and the second radial dynamic pressure bearing RB2 are arranged in the gap between the inner circumferential surface 16a of the cylindrical portion and the outer circumferential surface 22c such that a dynamic pressure in the radial direction is generated to support the rotating body R. In the first radial dynamic pressure bearing RB1 and the second radial dynamic pressure bearing RB2, at least one of the outer circumferential surface 22c and the inner circumferential surface 16a of the cylindrical portion, which face each other, has a dynamic pressure groove for generating a dynamic pressure, formed thereon. The dynamic pressure groove is formed into, for example, a herringborn-like shape.

When the rotating body R is rotated, the dynamic pressure groove generates a dynamic pressure such that the shaft 22 is supported by the dynamic pressure with a predetermined gap being created in the radial direction relative to the sleeve 16. Herein, the width of the dynamic pressure groove in the axial direction in the first radial dynamic pressure bearing RB1, is designed to be narrower than that in the axial direction in the second radial dynamic pressure bearing RB2. Thereby, dynamic pressures corresponding to lateral pressures having a strength different from each other in the axial direction of the shaft 22, are generated in the first radial dynamic pressure bearing RB1 and the second radial dynamic pressure bearing RB2, allowing optimal balance between high shaft stiffness and low shaft loss to be acquired.

On the other hand, the dynamic pressure bearing in the thrust direction includes at least one of a first thrust dynamic pressure bearing SB1, a second thrust dynamic pressure bearing SB2 and a third thrust dynamic pressure bearing SB3. Herein, the first thrust dynamic pressure bearing SB1 is formed by the lubricant 28 filled in the gap in the axial direction between the thrust upper surface 26a of the thrust member 26 fixed to the hub 20, and the lower surface of the flange portion 16b. The second thrust dynamic pressure bearing SB2 is formed by the lubricant 28 filled in the gap in the axial direction between the thrust lower surface 26b and the upper end surface portion 14d. The third thrust dynamic pressure bearing SB3 is formed by the lubricant 28 filled in the gap in the axial direction between the lower surface 20e and the upper surface of the flange portion 16b. In the following description, at least one of the first thrust dynamic pressure bearing SB1 to the third thrust dynamic pressure bearing SB3 is collectively referred to as a thrust dynamic pressure bearing SB.

On one of the surfaces facing each other of each of these gaps in the axial direction, is formed the thrust dynamic pressure groove (not illustrated) for generating a dynamic pressure. The thrust dynamic pressure groove is formed into, for example, a spiral-like or herringborn-like shape, and generates a pump-in dynamic pressure. With the rotation of the rotating body R, the thrust dynamic pressure bearing SB generates a pump-in dynamic pressure by the dynamic pressure, and exerts a force in the axial direction on the rotating body R by the pressure thus generated. The lubricants 28 filled in the gaps in the first radial dynamic pressure bearing RB1, the second radial dynamic pressure bearing RB2 and the thrust dynamic pressure bearing SB, are used in common with each other, and are prevented from leaking outwards by being sealed with the capillary seal portion, which will be described in the following description.

The capillary seal portion TS is structured with the outer circumferential surface of a member composing the fixed body S such as the sleeve 16 or the housing member 14 (hereinafter, referred to as "fixed body outer circumferential surface") and the inner circumferential surface 26d of the thrust member 26. The fixed body outer circumferential surface has an inclined surface, the diameter of which becomes gradually smaller when proceeding from the upper surface side to the lower surface side. The inclined surface is formed so as to have an inclined angle $\theta is$ relative to the rotational center line of the shaft 22. On the other hand, the inner circumferential surface 26d facing thereto also has an inclined surface, the diameter of which becomes gradually smaller when proceeding from the upper surface side to the lower surface side. The inclined surface is formed so as to have an inclined angle $\theta h$ relative to the rotational center line of the shaft 22, the inclined angle $\phi h$ being set to be greater than 0° and smaller than the inclined angle $\theta is$. That is, the relationship: $0 < \theta h < \theta is$ holds.

With such a structure, the fixed body outer circumferential surface and the inner circumferential surface 26d form the capillary seal portion TS, the gap of which becomes gradually wider when proceeding from the upper surface side to the lower surface side. Herein, because an amount of the lubricant 28 to be filled in the gap is set such that the boundary surface (fluid level) between the lubricant 28 and ambient air is located in the middle of the capillary seal portion TS, the lubricant 28 is sealed with the capillary seal portion TS by capillarity. As a result, the lubricant 28 is prevented from leaking outwards. That is, the lubricant 28 is filled between the housing member 14 and the thrust member 26 and also between the flange portion 16b and the hub 20.

As stated above, the capillary seal portion TS is designed such that the inner circumferential surface 26d thereof, an outside inclined surface thereof, has a diameter that becomes gradually smaller when proceeding from the upper surface side to the lower surface side. Thereby, with the rotation of the rotating body R, a centrifugal force in the direction where the lubricant 28 is moved toward the inside of the portion in which the lubricant is filled, is exerted on the lubricant 28, preventing, more surely, the lubricant 28 from leaking outwards. The communication passage I is secured by the groove 14a formed in the direction axially along the inner circumferential surface of the housing member 14. Because both sides of the first radial dynamic pressure bearing RB1 and the second radial dynamic pressure bearing RB2 are communicated with each other by the communication passage I, the whole pressure balance can be maintained at a good level even if an individual pressure balance of the radial dynamic pressure bearing is not maintained. Further, even if the balance among the dynamic pressures of the first radial dynamic pressure bearing RB1, the second radial dynamic pressure bearing RB2 and the thrust dynamic pressure bearing SB, is not maintained by a disturbance such as an force from outside exerted on the shaft 22 or the rotating body R, the pressures are instantly averaged to maintain the pressure balance. As a result, a floating amount of the rotating body R is stabilized relative to the fixed body S, allowing the disk drive device 100 with high-reliability to be acquired.

When assembling the disk drive device 100 according to the embodiment, for example, the sleeve 16 and the housing member 14 are integrated by adhesion or the like such that the thrust member 26 is sandwiched by them. Subsequently, when inserting the shaft 22 fixed to the hub 20 into the sleeve 16 thus assembled, the thrust member 26 may be fixed to the hub 20 by adhesion or press-fitting.

Subsequently, the structure of the disk drive device 100 will be described further in detail. Hereinafter, each item will be described as (1) to (13), but these items may be used in an arbitrary combination.

(1) When performing cutting on, for example, a metallic material to form the aforementioned thrust member 26, there is a problem that the cutting needs many efforts and a lot of fine burr remains on the surface or in the corner section thereof. The fine bun, after coming off due to an impact, etc., enters narrow gaps to deteriorate the rotational accuracy. Further, the fine burr entering narrow gaps promotes wearing of the baring unit, etc., causing a malfunction such as burn-in in a short time. To solve such problems, the thrust member 26 is formed by press working of a metallic material. As a result, the efforts for the working can be trimmed, and generation of the bun causing a problem can be reduced. For example, a donut-shaped base material is cut off from a stainless sheet such as SUS 304 having a thickness of 0.6 mm, and then the outer circumference thereof is pressed by press working; thereby, the thrust member 26 having an approximate cup shape, at the center of which a hole is opened, is formed. In this case, the thickness dimension of the ring portion 26e can be readily and accurately measured with a height gauge, etc., by making the upper surface of the descender portion 26c slightly lower than that of the ring portion 26e. If necessary, grinding with a barrel, etc., may be appropriately performed.

(2) The thrust dynamic pressure groove is also formed by rolling or cutting, but there is a problem that theses workings need many efforts and fine bun remains on the surface or in the corner section thereof. The fine burr comes off due to an impact, etc., and enters narrow gaps to deteriorate the rotational accuracy. Further, the fine bun entering narrow gaps promotes wearing of the baring unit, etc., causing a malfunction such as burn-in in a short time. To deal with such problems, in the ring portion 26e, thrust dynamic pressure grooves for generating a thrust dynamic pressure are formed by press working on the wall facing the flange portion 16b and the wall facing the upper end surface portion 14d. As a result, the efforts for the working can be trimmed, and generation of the burr causing a problem can be reduced.

(3) The thrust member 26 may be formed of a plastic material. As a result, the member can be accurately manufactured in a short time by using a metallic mold. Herein, the plastic material is not particularly limited, but as materials having a similar effect, polyetherimide, polyamide and polyimide and the like are more preferred in terms of characteristics such as accuracy and mechanical strength.

(4) In the case where the outer circumferential surface of the descender portion 26c and the inner circumferential surface of the first cylindrical portion 20b are fixed together with an adhesive, when intending the adhesive strength is strong, it is needed that an amount of the adhesive to be applied is made large. However, there is a problem that the function of the capillary seal is deteriorated with the adhesive that leaks out from the adhesion surface entering the capillary seal portion TS beyond the tip portion of the descender portion 26c. To deal with the problem, the base side edge of the descender portion 26c of the thrust member 26 is formed so as to more protrude than the base side edge of the first cylindrical portion 20b. Describing it in more detail, the tip portion of the descender portion 26c of the thrust member 26 is formed so as to extend more downwards than the tip portion of the first cylindrical portion 20b of the hub 20. As a result, it is suppressed that the adhesive leaking out from the adhesion surface between the two, enters the capillary seal portion TS beyond the tip of the descender portion 26c. Thereby, a sufficient amount of adhesive can be applied, allowing required adhesive strength to be secured.

(5) When the outer circumferential surface of the descender portion 26c and the inner circumferential surface of the first cylindrical portion 20b are fixed together with an adhesive, an amount of the adhesive to be applied is individually varied, causing a variation in the adhesive strength. Because an individual situation of applying the adhesive cannot be easily observed, there is a problem that a product having low adhesive strength due to an insufficient amount of the adhesive to be applied, is put on the market without being found in the manufacturing line. To deal with the problem, in the boundary portion between the exterior wall of the descender portion 26c and the interior wall at the base side edge of the first cylindrical portion 20b, a concave-shaped area is formed such that a redundant component of the adhesive used for fixing the exterior wall thereof and the interior wall thereof together, is retained. That is, by providing the concave area in the boundary portion between the descender portion 26c and the first cylindrical portion 20b and by filling the lubricant between the two, a state where the lubricant is sufficiently filled in the concave area can be visually and easily observed. Accordingly, if the lubricant is not sufficiently applied, the lubricant can be additionally applied; and thereby there is an effect that a variation in the adhesive strength can be suppressed and the impact resistance can be improved.

(6) As stated above, when intending the adhesive strength to be strong in the case where the outer circumferential surface of the descender portion 26c and the inner circumferential surface of the first cylindrical portion 20b are fixed together with an adhesive, an amount of the adhesive to be applied is needed to be large. However, there is a problem that the function of the capillary seal is deteriorated with the adhesive that leaks out from the adhesion surface between the two entering the capillary seal portion TS beyond the tip of the descender portion 26c. To deal with this, a protrusion extending in the outer diameter direction is formed at the base side edge of the descender portion 26c. That is, a convex area extending outwards is provided in the tip of the descender portion 26c. As a result, the lubricant leaking in this portion is blocked, and hence the lubricant can be prevented from entering the capillary seal portion TS. Thereby, a sufficient amount of the adhesive can be applied such that the required adhesive strength is secured.

Figure 6A:
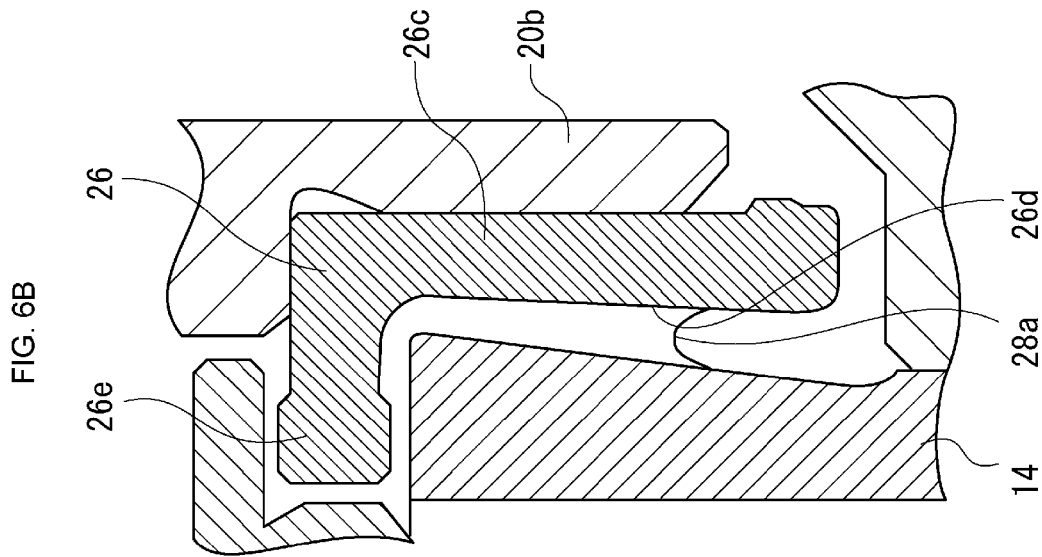
FIGS. 6A and 6B are partial cross-sectional views illustrating a capillary seal of the disk drive device in FIG. 2.
Figure 6B:
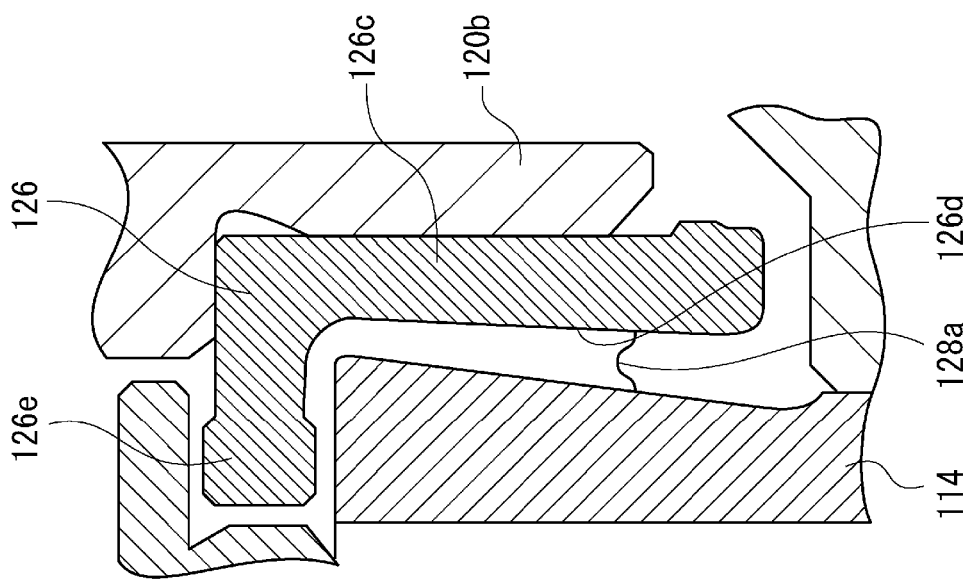

(7) The lubricant 28 is held by a surface tension and a centrifugal force in the capillary seal portion TS. FIGS. 6A and 6B are partial cross-sectional views illustrating the capillary seal of the disk drive device 100. FIG. 6A illustrates a structure of a disk drive device to be compared with the disk drive device 100 according to the present embodiment. If the surface roughness of the inner circumferential surface 126d of a descender portion 126c of a thrust member 126 is poor, a contact angle on the surface becomes large. As a result, the gas-liquid boundary 128a of a lubricant has a fillet geometry as illustrated in FIG. 6A. In the case of such a geometry, if the lubricant in a capillary seal portion TS becomes insufficient by falling and scattering, the lubricant is in shortage in a short time, thereby there is a problem that a failure such as burn-in, etc., may occur. To deal with this, the inner circumferential surface 26d is formed such that the surface roughness thereof is Ry 1.6 or less. As a result, the contact angle becomes small, allowing the gas-liquid boundary 28a to have a fillet geometry as illustrated in FIG. 6B. Thereby, there is an effect that an amount of the lubricant 28 lost by falling and scattering is reduced to the minimum level if an impact acceleration is applied to the lubricant 28. Alternatively, the required surface roughness thereof can be acquired by enhancing the surface roughness of a metallic mold during press working and then by finishing the surface multiple times as well as performing polishing on the tip of the descender portion 26c. It is more preferable that the surface roughness thereof is made Ry 0.8 or less, allowing the impact resistance to be more improved.

(8) If the capacity of the capillary seal portion TS is small, there is a problem that, when the lubricant 28 is scattered by an impact, the lubricant 28 is easily in shortage, causing a failure such as burn-in, etc. To deal with this, a concave-shaped area is formed in a place where the inner circumferential surface 26d of the descender portion 26c and the ring portion 26e are joined together. As a result, there is an effect that the space of the concave area becomes part of the capillary seal portion TS to increase the capacity thereof, and hence the lubricant 28 is hardly in shortage if the lubricant 28 is scattered due to an impact, allowing the impact resistance to be improved.

(9) With the demand for thinning the disk drive device 100, the housing member 14 is also requested to be thin. However, when the housing member 14 is thin, the stiffness thereof is deteriorated, and hence the housing member 14 undergoes elastic deformation due to an impact from outside such that the member 14 is in contact with the tip portion 22b. In this case, there is a problem that a contact between the rotating body and the fixed body generates scraped powder and the scraped powder enters a narrow gap, causing wearing to be accelerated or the bearing to be in a malfunction such as burn-in, etc. To deal with this, the shaft 22 may be fixed to the hub 20 such that one end of the shaft 22 is directed toward the sleeve 16, and the sleeve 16 stores the shaft 22 inside the tubular end surface. That is, the lower end of the sleeve 16 can be configured to protrude from the tip portion 22b. As a result, if the housing member 14 undergoes elastic deformation, it is blocked by the lower end of the sleeve 16, preventing the contact thereof with the tip portion 22b. With this structure, such a problem can be suppressed without generating the scraped powder due to an impact.

(10) The shaft 22 is fixed to the central hole of the hub 20 by press-fitting or adhesion. However, in order to thin the disk drive device 100, the portion of the hub 20 to be fitted into the shaft 22 is small in length, and hence it becomes difficult to secure sufficient strength against an impact. When a large amount of the adhesive is applied to increase the strength, the adhesive leaks out to enter the bearing unit, causing a problem that a malfunction may occur. Further, because the disk 50 is mounted on the outer circumference of the hub 20, a large stress is, when an impact is applied, exerted on the fitting-in portion between the hub 20 and the shaft 22, with the mass of the disk being added thereto, casing a failure such as deformation, etc., to likely occur. For example, if the hub 20 deforms so as to lean toward the shaft 22 due to an impact, the lower surface of the hub 20 and the upper surface of the flange portion 16b are in contact with each other, causing a problem that a malfunction may occur. To deal with such problems, the hub 20 has the central hole 20a into which the shaft 22 is press-fitted, and the step portion 22a is formed on the shaft such that, among the shaft, the portion press-fitted into the hole has a smaller diameter than that of another portion. As a result, because the lean of the hub 20 is suppressed and the strength is increased, and also because the adhesive is, even if the adhesive leaks out, prevented from entering the bearing unit, a larger amount of the adhesive can be applied, allowing the impact resistance thereof to be greatly improved. For example, the shaft 22 has a diameter of 2.5 mm and the step portion 22a has that of 2.1 mm, and therefore a seat portion having a depth of 0.2 mm on either side thereof, is provided.

(11) Until now, a shaft having a diameter of 3.0 mm is used in disk drive devices even for mobile applications. In the case, the force for extracting the shaft from the hub is designed to be approximately 300 N. However, in order to reduce a current, the disk drive device has to be configured to have a thin shaft having a diameter of 2.5 mm or less. On the other hand, in order not to cause a failure while the disk drive device is actually being used, the device preferably has the impact resistance of 1300 G or more as the maximum impact for a short time, for example 1 ms. To solve such a problem, the force for extracting the shaft 22 fitted into the central hole 20a of the hub 20 is designed to be 600 N or more, when the shaft 22 has a diameter of 2.5 mm or less. With such a structure, the disk drive device can withstand an impact of 1300 G or more as the maximum impact for a short time, for example, 1 ms.

Hereinafter, a specific example will be described. The shaft 22 made of stainless has a diameter of 2.5 mm and the step portion 22a thereof having a smaller diameter has that of 2.1 mm; and the surface roughness in the step portion is Ra 0.15 or less. In such a structure, in order to further increase the strength, a recess (concave area) in the radial direction at the base of the step portion 22a is eliminated such that a rounded portion having Ra 0.07 or less is provided. On the other hand, the central hole 20a of the hub 20 made of stainless is designed to have a diameter of 2.1 mm such that the shaft 22 is fixed to the hub 20 by light press-fitting and adhesion combined together, the light press-fitting being performed with a press-fitting interference being 15 μm to 20 μm to adjust dimension tolerances. The length in the axial direction of the fitting-in portion between the shaft 22 and the central hole 20a is designed to be 1.44 mm. Assembly is performed in a way that the step portion 22a of the shaft 22, having a smaller diameter, is applied with the adhesive, and then slowly press-fitted into the central hole 20a; thereby the shaft 22 being smoothly assembled at a predetermined position. The shaft 22 can be smoothly press-fitted into the hole, because the surface roughness of the shaft 22 is as fine as Ra 0.15 or less and the adhesive applied thereto functions as a lubricant at the press-fitting. With such a structure, the force for extracting the shaft 22 from the hub 20 is 600 N or more, thereby the disk drive device 100 that can withstand an impact of 1300 G or more as the maximum impact for a short time, for example, 1 ms, can be structured. In addition, components and manufacturing steps for the device 100 can be readily managed by checking the force for extracting the shaft 22, with the sample inspection in manufacturing the devices.

(12) In a disk drive device, when the inner surface of the hub is processed by cutting with a byte, a place where the cutting is not performed is generated inside the corner section of the hub, the place having a width corresponding to the radius Rb of the tip of the byte. The radius Rb of the tip of the byte has at smallest a limit of approximately 0.2 mm in practical use, but never reduced to 0. Conversely, when Rb is made small, an area to be cut in one rotation of the byte is decreased, and hence the period necessary for cutting the whole of the hub is inversely increased and wearing of the byte is intensified. When there is a place where the cutting is not performed, the place having a width corresponding to the radius Rb of the tip of the byte, at the corner section of the inner circumferential surface, the ring-shaped magnet is, when fixing the magnet to such a place, spaced apart therefrom because of interference with the outer circumferential corner section of the magnet and such place. In order to prevent this, a concave area is generally provided in the radial direction at the corner section of the second cylindrical portion; however, the concave area deceases the strength of the second cylindrical portion.

Further, because a disk having a large mass is mounted on the outer circumference of the hub, a large stress is, when a large impact acceleration, for example, 1300 G, is applied, exerted in the radial direction, with the mass of the disk being added to; and therefore the hub is likely to deform. The deformation of such a place entails deformation of the inner circumference of the ring-shaped magnet. Thereby, the coaxial degree with the outer circumference of the stator core facing through a narrow gap, is deteriorated such that a rotational fluctuation occurs, causing a malfunction in the disk drive device. At worst, there is a problem that the inner circumference of the ring-shaped magnet is partially in contact with the outer circumference of the stator core, causing a serious malfunction.

To deal with the problem, the hub 20 has the inner circumferential wall of the second cylindrical portion 20c, and the protruded pedestal portion 20f formed at a position spaced apart from the inner circumferential wall in the central direction of the hub 20. The ring-shaped magnet 24 is fixed with the pedestal portion 20f and the inner circumferential wall of the second cylindrical portion 20c. By providing the pedestal portion 20f in a portion where the hub 20 to be cut by a byte and the outer circumferential corner section of the upper surface of the ring-shaped magnet 24 are in contact with each other, the impact resistance thereof can be improved. Because the thickness in the up-down direction of the hub 20 is larger than that in the circumferential direction of the second cylindrical portion 20c, the strength thereof is less decreased when the pedestal portion 20f is provided, and deformation thereof hardly occurs. Further, because the deformation, even if occurs, occurs in the axial direction, the influence by the deformation on the gap between the ring-shaped magnet 24 and the stator core 12 is small. Therefore, even if a large impact acceleration is applied, a possibility that a malfunction may occur in the disk drive device 100 is small.

(13) In a disk drive device until now, when a disk is mounted on the outer circumference of the hub, the hub is to support a large mass. If an impact acceleration is applied in such a state, a large stress is exerted on the hub with the large mass being added to. In a state where a disk is mounted, when the gravity of center of the rotating body such as the ring-shaped magnet, which is rotated integrally with the hub, is located on the center line of rotation and near the fitting-in portion between the hub and the shaft, deformation occurs such that the hub and the disk tilt, with the fitting-in portion between the hub and the shaft being a fulcrum point, if an impact acceleration is applied in the axial direction. If such deformation occurs even slightly, the gap between the inner circumference of the ring-shaped magnet and the outer circumference of the stator core, becomes non-uniform. Such non-uniformity causes a variation in rotation, and at worst, scraped powder is generated by a contact between the two. Also, there is a problem that the scraped powder travels in the gap, becoming an obstacle for rotation.

To solve such a problem, a way can be considered in which the gap between the inner circumference of the ring-shaped magnet and the outer circumference of the stator core is made large; however, the way increases a magnetic resistance, leading to decrease in the magnetic flux. Thereby, there is a harmful effect that the torque is decreased and increase in the leaking magnetic flux adversely affects the magnetic head. Also, another way can be considered in which, by making the diameter of the outer circumference of the hub small, the gap between the inner circumference of the ring-shaped magnet and the outer circumference of the stator core is less affected by the tilt of the rotating body; however, the way decreases the torque, leading to increase in a current. Therefore, these ways cannot be adopted.

To deal with the problem, when the center of gravity G of the rotating body R is, in the case where the disk 50 is mounted on the hub 20, located near the place where the hub 20 and the shaft 22 are fixed together, the disk drive device 100 is structured as follows: the distance between the center position of the stator core 12 in the direction toward the hub 20 from the base member 10, and the center of gravity G of the rotating body R in the same direction, is designed to be 1.8 mm or less. With such a structure, the impact resistance can be improved. In known techniques, the distance in the axial direction between the center position in the axial direction of the stator core and the center of gravity of the rotating body is, for example, 2.0 mm or more, causing the impact resistance to be insufficient.

Figure 7:
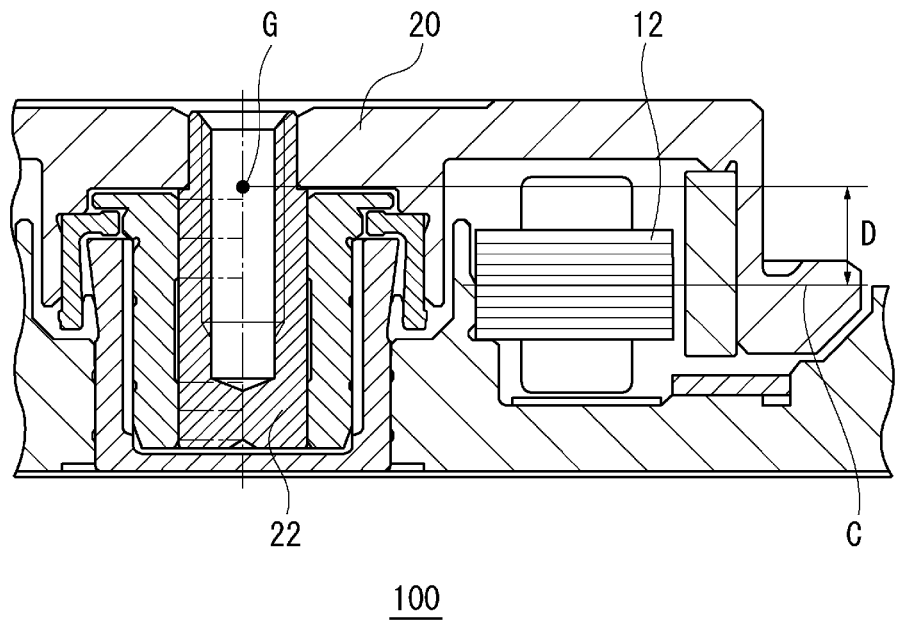
FIG. 7 is a partial cross-sectional view illustrating the center of gravity of a rotating body and the center position of a stator core in the disk drive device in FIG. 2.

FIG. 7 is a partial cross-sectional view illustrating the center of gravity of the rotating body R and the center position of the stator core in the disk drive device 100. In FIG. 7, G indicates a position of the center of gravity of the rotating body R including the disk 50, which is located on the center line of rotation and near the fitting-in portion between the hub 20 and the shaft 22. For example, the diameter of the outer circumference of the hub 20 is designed to be 15 to 25 mm, and the gap between the inner circumference of the ring-shaped magnet 24 and the outer circumference of the stator core 12 to be 0.1 to 0.3 mm. Further, by making the thickness of the portion immediately below the coil 18 of the base member 10 thick, the position of the stator core 12 is moved upwards, and the center position C in the axial direction of the stator core 12 is designed to be spaced 1.8 mm or less apart in the axial direction from the center of gravity of the rotating body R. In FIG. 7, the distance in the axial direction is indicated as D.

As a result, if an impact of 1300 G is applied, a possibility that the inner circumference of the ring-shaped magnet 24 and the outer circumference of the stator core 12 may be in contact with each other is reduced, allowing the impact resistance to be improved. When the distance in the axial direction is set so as to be small, the base member 10 can be made thicker with it, allowing the stiffness thereof to be enhanced and the impact resistance to be improved. More preferably, the impact resistance can be further improved by designing such a distance D in the axial direction to be 1.6 mm or less. However, with the position in the axial direction of the stator core 12 being higher, the coil 18 wound around the stator core 12 becomes in contact with the lower surface of the hub 20, and therefore the lower limit of the distance D in the axial direction is set to 1.2 mm. Further, by making the thickness of the portion immediately below the coil 18 of the base member 10, 150% or more relative to that of the portion immediately on the coil 18 of the hub 20, the stiffness of the base member 10 is enhanced and the mass of the rotation body is reduced, allowing the impact resistance to be improved. In a specific example, the thickness of the portion immediately below the coil 18 of the base member 10 is made 1.5 mm, and that of the portion immediately on the coil 18 of the hub 20 is made 1.0 mm. It is noted that the thickness dimensions are measured with a hole or concavities and convexities being excluded. If the thickness of the portion immediately on the coil 18 of the hub 20 is made 0.5 mm or less, the stiffness of the hub 20 is often insufficient, and therefore the upper limit is set to 400%.

It has been described that the aforementioned thrust dynamic pressure bearing SB is structured with the gap in the axial direction of any one of the first thrust dynamic pressure bearing SB1, the second thrust dynamic pressure bearing SB2 and the third thrust dynamic pressure bearing SB3. However, it is possible that the thrust dynamic pressure bearing SB is structured with two or three of the gaps in the axial direction where dynamic pressures are generated, so that the actions thereof are complementary to each other. Such structure does not depart from the spirit and scope of the present invention.

Figure 8:
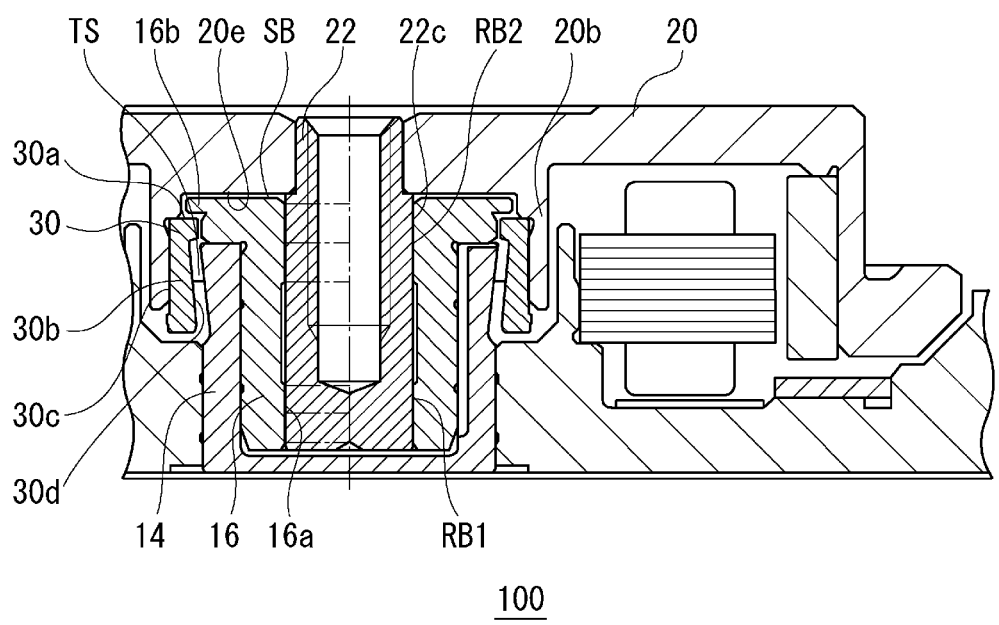
FIG. 8 is an enlarged cross-sectional view illustrating a disk drive device according to a variation of the present invention.

Subsequently, a variation thereof will be described. The variation relates to the same disk drive device 100 as in the present embodiment. In the embodiment, the thrust member 26 includes the ring portion 26e and the descender portion 26c. On the other hand, in the variation, the thrust member includes only the descender portion. Such a descender portion may be considered to be a ring portion, but herein will be described as a descender portion. FIG. 8 is an enlarged cross-sectional view illustrating a disk drive device 100 according to the variation of the present invention. In FIG. 8, components common with those in FIG. 2, etc., are denoted with the same reference numerals and descriptions thereof will be omitted. In each of the first radial dynamic pressure bearing RB1 and the second radial dynamic pressure bearing RB2, for example, a heringborn-like dynamic pressure groove for generating a dynamic pressure is formed in at least one of the outer circumferential surface 22c and the inner circumferential surface 16a of the cylindrical portion in a gap between the two, in the same way as until now. On the other hand, in the thrust dynamic pressure bearing SB, for example, a spiral-shaped thrust dynamic pressure groove (not illustrated) for generating a dynamic pressure is formed on one of the lower surface 20e and the upper surface of the flange portion 16b, which face each other, in a gap in the axial direction between the two.

The thrust member 30 includes the upper end portion 30a, the descender portion 30b, the outer circumferential surface 30c and the inner circumferential surface 30d. That is, the thrust member 30 does not include the ring portion 26e, but has an approximate ring shape such as the descender portion 30b corresponding to the descender portion 26c. The upper end portion 30a faces the lower surface of the flange portion 16b of the sleeve 16 so as to create a narrow gap, and performs a function of preventing the thrust member from coming off. The outer circumferential surface 30c of the descender portion 30b is fixed to the inner circumferential surface of the first cylindrical portion 20b of the hub 20. When structuring the two by fixing them with an adhesive, a concave area as illustrated in FIG. 8 may be provided on the inner circumferential surface of the first cylindrical portion 20b of the hub 20, as a place where the adhesive is retained, thereby adhesive strength being improved and leaking out of the adhesive being prevented.

The capillary seal portion TS is structured with the outer circumferential surface of a member composing the fixed body S such as the sleeve 16 or the housing member 14 (hereinafter, referred to as "fixed body outer circumferential surface") and the inner circumferential surface 30d of the descender portion 30b of the thrust member 30. The dimension in the radial direction (dimension in the vertical direction of FIG. 8) of the thrust member 30 is designed to be as short as 0.3 to 0.5 mm such that the space in the radial direction is not occupied uselessly, allowing the dimensions of the bearing portion and stator core 12 portion to be large. On the other hand, by making the dimension in the axial direction (dimension in the vertical direction of FIG. 8) of the thrust member 30 as large as 1.5 to 3.0 mm, the capacity of the capillary seal portion TS on the inner circumferential surface is enlarged, and the fixing strength to the inner circumferential surface of the first cylindrical portion 20b is enhanced.

The not-illustrated communication passage I is secured by the groove 14a formed in the direction axially along the inner circumferential surface of the housing member 14, and by a groove formed, among the upper surface of the housing member 14, in a portion where the upper surface thereof is in contact with the upper surface of the flange portion 16b. Both sides of the first radial dynamic pressure bearing RB1 and the second radial dynamic pressure bearing RB2 are communicated with each other by the communication passage I, the whole pressure balance can be maintained at a good level, even if an individual pressure balance of the radial dynamic pressure bearing is not maintained.

Also, with respect to the thrust member 30, the following items may be arbitrarily adopted in the same way as the embodiment: the member 30 is formed by press working of a metallic material; the member 30 is formed of a plastic material; the tip of the descender portion 30b extends more downwards than that of the first cylindrical portion 20b; a concave area is provided at the boundary portion between the outer circumferential surface of the descender portion 30b and the tip of the first cylindrical portion 20b such that an adhesive is filled therein; the tip of the descender portion 30b is provided with a convex area extending outwards; and the surface roughness of the inner circumferential surface 30d is Ry 1.6 or less. Needless to say, it is clear that operations and effects by the aforementioned items are the same as those of the embodiment.

The following items may be arbitrarily adopted in the same way as the embodiment: the lower end of the sleeve 16 is made protrude from the lower end of the shaft 22; among the shaft 22, the diameter of a portion thereof where the shaft 22 is fitted into the central hole 20a, is made smaller than that of another portion such that the step portion 22a is provided; in the case where the diameter of the shaft 22 is 2.5 mm or less, the force for extracting the shaft 22 from the central hole 20a is to be 600 N or more; the pedestal portion 20f is provided in the hub 20 that is to be processed by cutting with a byte, so that the pedestal portion 20f and the ring-shaped magnet 24 are configured to be in contact with each other; the distance in the axial direction between the center position in the axial direction of the stator core 12 and the center of gravity of the rotating body R, is to be 1.8 mm or less; and the thickness of the portion immediately below the coil 18 of the base member 10 is to be 150% or more relative to that of the portion immediately on the coil 18 of the hub 20. Needless to say, it is clear that operations and effects by the aforementioned items are the same as those of the embodiment.

According to the embodiment of the present invention, the thrust member has the descender portion in addition to the ring portion, and hence the fixing area with the hub can be enlarged. Further, because the fixing area with the hub is enlarged, the impact resistance can be improved. Further, because the thrust member has the descender portion in addition to the ring portion, the capacity of the capillary seal can be enlarged. Further, because the capacity of the capillary seal is enlarged, an amount of the lubricant can be enlarged. Because the amount thereof is enlarged, the impact resistance can be improved. Further, because the thrust member is fixed to the hub with an adhesive, deformation of the descender portion can be suppressed. Further, because the deformation thereof is suppressed, the function of the capillary seal can be secured. Further, the function of the capillary seal is secured, the impact resistance can be improved. Further, a disk drive device in which a failure or a malfunction never occurs in a short time even if a large impact is applied thereto, can be provided. Further, such a disk drive device can be used in a wide range of applications such as mobile devices to which larger impacts are applied. Further, a disk drive device that is smaller in size, thinner, and lighter in weight, in comparison with another device having the same impact resistance as the aforementioned one, can be readily realized.

The present invention should not be limited to each of the aforementioned embodiments, and various modifications such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

In the embodiment of the present invention, the thrust member 26 is fixed to the hub 20 with an adhesive. However, without limiting thereto, the thrust member 26 may not be fixed to the hub 20 with an adhesive, but fixed thereto with another measure. According to the present variation, the degree of freedom in fixing them together can be improved.

In the embodiment of the present invention, the sleeve 16 and the housing member 14 are structured as separate members. However, without limiting thereto, for example, the sleeve 16 and the housing member 14 may be formed integrally. In the case, the communication passage I may be a hole penetrating from the lower surface of the sleeve 16 through the upper surface of the flange portion 16b. According to the present variation, the degree of freedom in designing the disk drive device 100 can be improved.

What is claimed is:

1. A disk drive device comprising:
a hub on which a recording disk is to be mounted;
a shaft that is rotated integrally with the hub;
a supporting member that surrounds the shaft and that has a flange radially extending outward at the hub side edge;
a base member that supports the supporting member; and
a cylindrical thrust member that is rotated integrally with the hub,
wherein a diameter of the shaft is 2.5 mm or less,
wherein the hub is formed of a stainless material having magnetism and has an annular portion,
wherein a magnet is fixed to an inner circumferential surface of the annular portion,
wherein the hub has a step portion on an inner portion of the hub,
wherein a top portion of the thrust member is partially affixed to the step portion of the hub in the axial direction, and
wherein a part of the top portion of the thrust member not partially affixed axially faces at least part of the flange.

2. The disk drive device according to claim 1, wherein the supporting member has an inner member that surrounds the shaft and an outer member that surrounds the inner member, and
wherein the outer member is in a cup-like shape and formed from a stainless material, a copper alloy, or a sintered alloy by powder metallurgy.

3. The disk drive device according to claim 1, wherein the hub has a descending portion that axially extends towards the base member and that annularly surrounds part of the supporting member within the inner portion of the hub,
wherein the thrust member is affixed with an adhesive to the inner portion of the hub along the descending portion of the hub, so as to allow the thrust member to rotate with the shaft, and
wherein a base side edge of the thrust member is formed so as to protrude beyond the descending portion of the hub in the axial direction.

4. The disk drive device according to claim 1, wherein the base member is formed of an aluminum sheet or a steel plate.

5. The disk drive device according to claim 1, wherein the hub has a protruded pedestal portion formed at a position spaced apart from the annular portion in the central direction of the hub, and fixes the magnet with the pedestal portion and the inner circumferential surface of the annular portion.

6. The disk drive device according to claim 1, wherein the base member has an ascending portion that axially extends towards the hub and that annularly surrounds part of the supporting member within the inner portion of the hub,
wherein the supporting member and the ascending portion form an annular area, and
wherein the base side edge of the thrust member is rotated in the annular area.

7. A disk drive device comprising:
a hub on which a recording disk is to be mounted;
a shaft that is rotated integrally with the hub;
a supporting member that surrounds the shaft and that has a flange radially extending outward at the hub side edge;
a base member that supports the supporting member; and
a cylindrical thrust member that is rotated integrally with the hub,
wherein the hub has a step portion on an inner portion of the hub,
wherein a top portion of the thrust member is partially affixed to the step portion of the hub in the axial direction, wherein a part of the top portion of the thrust member not partially affixed axially faces at least part of the flange, wherein the supporting member has an inner member that surrounds the shaft and an outer member that surrounds the inner member, wherein the outer member is fixed to the base member, wherein the flange is provided at the hub side edge of the inner member, the inner member being formed separately from the outer member, wherein the outer member is formed from a metallic material, and wherein the base member is formed from an aluminum sheet or a steel plate.

8. The disk drive device according to claim 7, wherein the hub has a descending portion that axially extends towards the base member and that annularly surrounds part of the supporting member within the inner portion of the hub, wherein the thrust member is affixed with an adhesive to the inner portion of the hub along the descending portion of the hub, so as to allow the thrust member to rotate with the shaft, and wherein a base side edge of the thrust member is formed so as to protrude beyond the descending portion of the hub in the axial direction.

9. The disk drive device according to claim 7, wherein the base member has an ascending portion that axially extends towards the hub and that annularly surrounds part of the supporting member within the inner portion of the hub, wherein the supporting member and the ascending portion form an annular area, and wherein the base side edge of the thrust member is rotated in the annular area.

10. The disk drive device according to claim 7, wherein the hub is formed of a stainless material having magnetism.

11. The disk drive device according to claim 7, wherein a diameter of the shaft is 2.5 mm or less.

12. The disk drive device according to claim 7, wherein the hub has an annular portion and a protruded pedestal portion formed at a position spaced apart from the annular portion in the central direction of the hub, and fixes a magnet with the pedestal portion and the inner circumferential surface of the annular portion.

13. A disk drive device comprising:
a hub on which a recording disk is to be mounted;
an inner member that surrounds an axis of rotation of the hub, and that has a flange radially extending outward at the hub side edge;
an outer member that surrounds the inner member;
a base member that supports the inner member and the outer member; and
a cylindrical thrust member that is rotated integrally with the hub, wherein the hub has a descending portion that axially extends towards the base member, wherein the thrust member is fixed to an inner surface of the descending portion of the hub, wherein a part of the top portion of the thrust member axially faces at least part of the flange, wherein the outer member is fixed to the base member, wherein the outer member has a cylindrical portion and a bottom portion, the two portions being integrally formed, wherein the outer member is formed from a metallic material, wherein the bottom portion is provided to the base member side edge of the cylindrical portion, wherein the hub has an annular portion, and fixes a magnet with an inner circumferential surface of the annular portion, wherein the thrust member is provided away from the magnet, wherein the flange and the outer member form an annular area, and wherein a part of the thrust member is rotated in the annular area.

14. The disk drive device according to claim 13, wherein the descending portion annularly surrounds part of the inner member within the inner portion of the hub, wherein the thrust member is affixed with an adhesive to the inner portion of the hub along the descending portion of the hub, and wherein a base side edge of the thrust member is formed so as to protrude beyond the descending portion of the hub in the axial direction.

15. The disk drive device according to claim 13, wherein the hub has a protruded pedestal portion formed at a position spaced apart from the annular portion in the central direction of the hub, and fixes the magnet with the pedestal portion.

16. The disk drive device according to claim 13, wherein the hub is formed of a stainless material having magnetism.

17. The disk drive device according to claim 13, wherein a thrust dynamic pressure groove is formed on a surface of the thrust member, the surface facing the outer member in the axial direction.

18. The disk drive device according to claim 13, wherein a thrust dynamic pressure groove is formed on a surface of the thrust member, the surface facing the flange in the axial direction.

19. The disk drive device according to claim 13, wherein the hub has a fitting portion into which the central holes of the recording disk is fitted, wherein the magnet overlaps the fitting portion in the axial direction.

* * * * *